United States Patent [19]
Stewart et al.

[11] Patent Number: 5,628,171
[45] Date of Patent: May 13, 1997

[54] MULCHING MOWER CONVERTIBLE TO DISCHARGE/COLLECTION MODE

[75] Inventors: Bradley G. Stewart, Eden Prairie; David J. Hunt, Brooklyn Park, both of Minn.

[73] Assignee: The Toro Company, Minneapolis, Minn.

[21] Appl. No.: 505,948

[22] Filed: Jul. 24, 1995

[51] Int. Cl.⁶ .................................................. A01D 34/66
[52] U.S. Cl. ............................. 56/320.2; 56/2; 56/DIG. 9
[58] Field of Search .............................. 56/320.1, 320.2, 56/10.1, 14.7, DIG. 9, 2

[56] References Cited

U.S. PATENT DOCUMENTS

| | | | |
|---|---|---|---|
| 5,133,176 | 7/1992 | Baumann et al. | 56/320.1 X |
| 5,267,429 | 12/1993 | Kettler et al. | 56/320.2 X |
| 5,465,564 | 11/1995 | Koehn et al. | 56/320.2 |
| 5,488,821 | 2/1996 | McCunn et al. | 56/320.1 X |

FOREIGN PATENT DOCUMENTS 1584495  2/1981  United Kingdom .

*Primary Examiner*—Terry Lee Melius
*Attorney, Agent, or Firm*—James W. Miller

[57] ABSTRACT

A multi-bladed mulching mower comprises a cutting deck having a peripheral skirt and side discharge outlet. A plurality of cutting chambers extend across the width of the deck and are defined by vertically extending shroud walls that depend downwardly from a top wall of the deck. A rotatable cutting blade is received inside each cutting chamber. The mower can be converted to a discharge/collection mode of operation by removing a portion of the shroud walls adjacent the side discharge outlet. The removed portion of the shroud walls extends laterally across the deck but is substantially less than the entire transverse width of the cutting chamber array to allow the removed portion of the shroud walls to be installed or removed through the side discharge outlet. A plurality of rotatable knobs removably attach the shroud portion to the deck with the knobs being accessible from above the deck to further ease the tasks of installing or removing the shroud portion.

32 Claims, 4 Drawing Sheets

MULCHING MOWER CONVERTIBLE TO DISCHARGE/COLLECTION MODE

TECHNICAL FIELD

This invention relates to a mulching mower, particularly to a multi-bladed mulching mower, which can be quickly and easily converted to operation in a grass discharge/collection mode by removing a portion of the shroud walls that define the cutting chambers.

BACKGROUND OF THE INVENTION

Mulching mowers are known having multiple cutting blades suspended beneath the cutting deck. In some of these mowers, a plurality of cutting chambers are formed on the underside of the deck surrounding the blades. Shroud walls which are separate from the usual peripheral skirt on the deck extend downwardly over interior portions of the top wall of the deck to define the cutting chamber array. In a mulching mode of operation, the external shroud walls are generally unbroken to confine the circulation of the grass clippings to the interior of the cutting chambers. Thus, the grass clippings are eventually driven downwardly through the open bottom faces of the cutting chambers by the action of the cutting blades and various grass deflecting members, known as kickers, that are often positioned within the cutting chambers above the plane of rotation of the blades. One such multi-bladed mower of this general type is shown in U.S. Pat No. 5,133,176 to Baumann et al., which is assigned to the assignee of this invention.

The multi-bladed mower shown in the Baumann et al. patent is dedicated to mulching, i.e. the cutting chambers are always peripherally enclosed such that the only exit for the grass clippings is downwardly through and out of the open bottom faces of the cutting chambers. While the Baumann et al. structure is a very effective mulching mower, it is not able to discharge the grass clippings to the side of the mower deck for deposit on the grass or into a grass collection device such as a bag or hopper. To the extent that such a discharge/collection mode is desirable at times, the Baumann et al. mower does not satisfy this desire. Accordingly, a mower that is convertible between a mulching mode of operation and a discharge/collection mode of operation would have certain advantages.

The Toro Company of Minneapolis, Minn. has previously manufactured and sold a multi-bladed mower which can be converted from a mulching mode of operation to a discharge/collection mode of operation. Such a mower could be converted by removing the front half of the cutting chamber shroud extending from one side of the mower to the other so that the grass clippings would no longer be confined to the cutting chambers, but could flow through the cutting chambers in a grass discharge path out through a side discharge outlet. The removable front half of the shroud was mostly bolted into place by a plurality of downwardly or inwardly extending bolts that were secured by nuts located beneath the underside of the deck.

While this mower could be converted to a discharge/collection mode of operation, it was difficult and time consuming to do so. The walls defining the removable shroud half were sufficiently thick or deep that the shroud half could not simply be loosened and dropped down onto the ground. Even with the deck in its highest position and with the removable shroud half sitting on the ground after being loosened, the shroud half still extended above the lower lip or edge of the skirt of the cutting deck. Thus, the peripheral skirt of the cutting deck prevented one from simply pulling the shroud half out from beneath the skirt even with a maximum elevation of the deck.

Thus, in this prior art mower, the user had to lift or jack the entire mower up, including the traction unit to which the cutting deck was attached, to gain additional clearance between the underside of the deck and the ground. Then, the user would have to crawl or reach beneath the deck to loosen all of the securing nuts located below the top wall of the deck. After such nuts were loosened and with sufficient clearance having been gained by jacking the mower up, the removable shroud half would then fall down onto the ground. The user could then slide or pull the shroud half outwardly beneath the raised skirt on the deck. The need to jack the deck up, and the need to crawl or reach beneath the deck to unscrew or unbolt the removable shroud half, made this conversion procedure difficult and time consuming. As a practical matter, this difficulty often deterred the user from making the conversion in the first place—the mower was often simply left in its mulching mode even if conversion to the discharge/collection mode was otherwise desirable.

An alternative method of converting the prior art mower to its discharge/collection mode was to remove the cutting deck from the traction unit prior to removal of the removable shroud half. This avoided having to lift or jack the entire mower up as only the cutting deck would have to be raised sufficiently to allow the removable shroud half to be removed. However, the need to remove the cutting deck from the traction unit, and the subsequent need to replace it on the traction unit after the conversion process is finished, was itself time-consuming. Accordingly, this alternative conversion method was not much better than simply jacking the entire mower up in terms of difficulty or the time required to do the work.

SUMMARY OF THE INVENTION

One aspect of this invention is to provide a mulching mower which is more easily convertible to a discharge/collection mode of operation through removal of a portion of the shroud means defining the cutting chambers.

This and other aspects of this invention are provided in a multi-bladed mower which is convertible between a discharge/collection mode of operation and a mulching mode of operation. The mower comprises a cutting deck which is movable over the ground, wherein the cutting deck includes a peripheral skirt with such skirt having a laterally opening side discharge outlet for grass clippings. A shroud means is provided having a predetermined transverse width relative to the deck with the shroud means extending downwardly from the deck and substantially defining a plurality of generally cylindrical cutting chambers extending laterally across the deck with one cutting chamber being located nearest the side discharge outlet. Adjacent cutting chambers have interior openings connecting one another to allow at least some grass clippings to travel between cutting chambers. A rotatably driven, substantially horizontal cutting blade is mounted in each of the cutting chambers. Finally, a means is provided for removably attaching a portion of the shroud means to the deck to convert the deck between the mulching mode of operation in which the shroud portion is installed in the deck and the cutting chambers are closed to the side discharge outlet and the discharge/collection mode of operation in which the shroud portion is removed from the deck and the cutting chambers are open to the side discharge outlet. The removable shroud portion forms part of at least the one cutting chamber nearest the side discharge outlet and extends laterally relative to the deck over substantially less than the entire transverse width of the shroud means such that the removable shroud portion can be easily installed or removed from the deck by passing it in or out of the side discharge outlet.

DETAILED DESCRIPTION OF A PREFERRED EMBODIMENT

Figure 1:
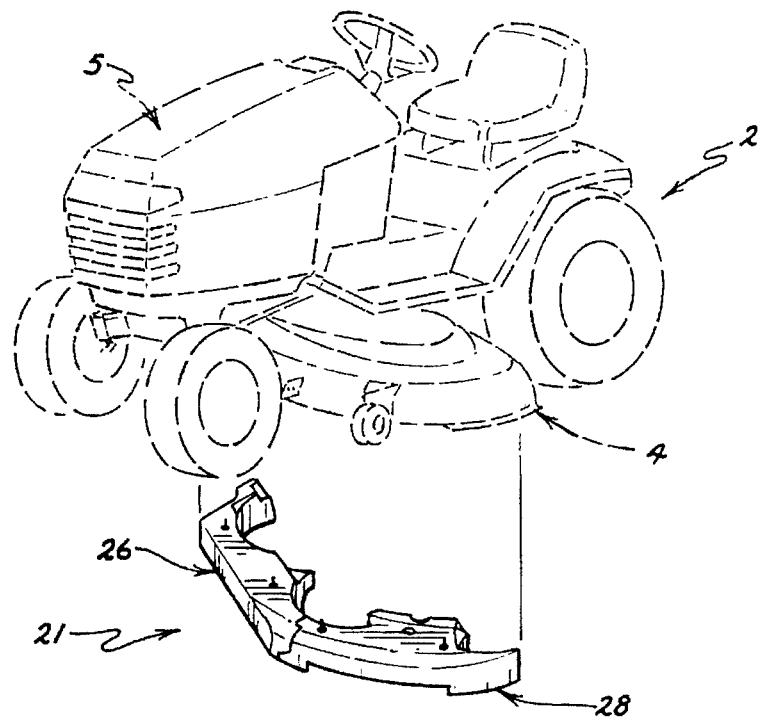
FIG. 1 is a perspective view of an improved mower according to this invention, particularly showing the removable shroud portions assembled together but removed from the cutting deck in an exploded manner to allow the removable shroud portions to be separately illustrated.

Referring to the drawings, wherein like reference numerals designate like parts and assemblies throughout the several views, a multi-bladed rotary lawn mower of the present invention as illustrated in FIG. 1 is designated as 2. Mower 2 includes a cutting deck 4 having a horizontally extending top wall 6, generally vertically extending side walls defining a peripheral skirt 10 extending downwardly from and around the periphery of top wall 6, and a side discharge outlet 12 opening laterally from skirt 10. Side discharge outlet 12 is preferably formed by removing a portion of skirt 10 on one side of deck 4. Alternatively, side discharge outlet 12 can comprise an opening or window within skirt 10 rather than a missing or removed portion of skirt 10.

Mower 2 also includes a traction unit 5 (shown in FIG. 1) for suspending and moving deck 4 over the ground. Traction unit 5 comprises a small tractor of the type well known in the lawn and garden industry. Alternatively, traction unit 5 could comprise a large, self-propelled, walk behind lawn mower (not shown) typically known in the art as a wide area mower or WAM.

Carried under cutting deck 4 are side-by-side cutting blades 14 operatively connected to the prime mover (not shown). Each blade 14 rotates in a substantially horizontal cutting plane. Cutting blades 14 rotate in the same direction as shown by the arrows A in FIG. 2 to contact and sever standing grass at a level determined by the height of cutting deck 4 relative to the ground. Conventional means (not shown) are provided on deck 4 for adjusting the height of deck 4 from a minimum to a maximum height.

Figure 2:
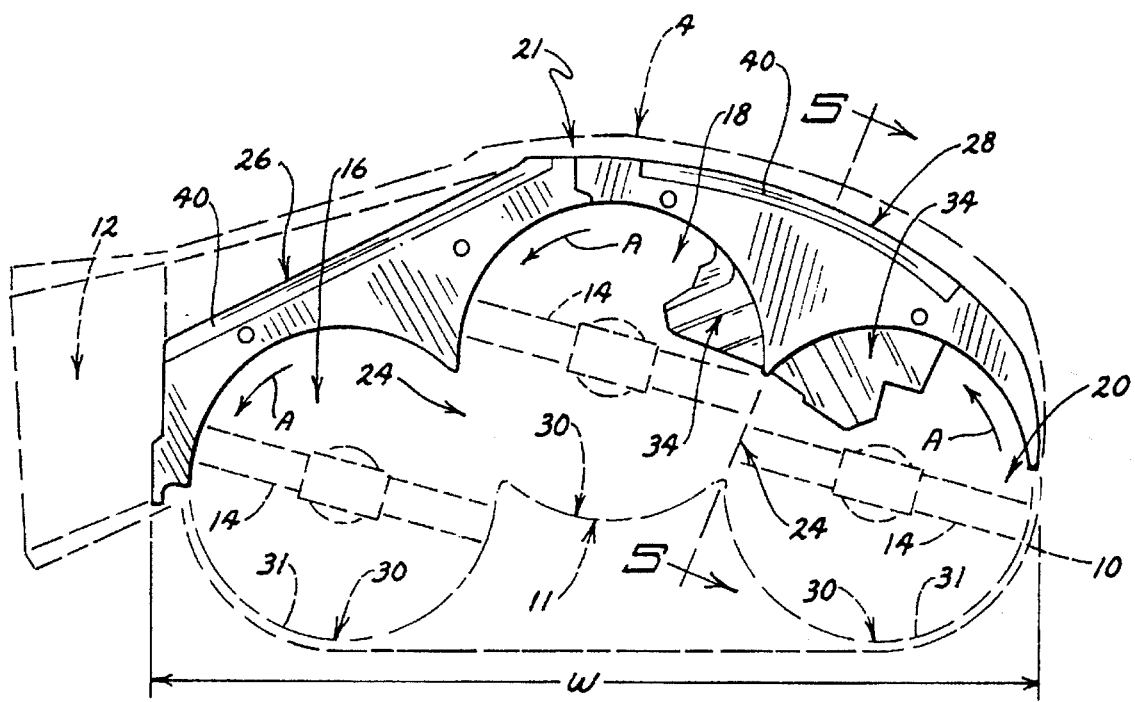
FIG. 2 is a bottom plan view of the cutting deck of the mower of FIG. 1, particularly illustrating the removable shroud portions installed in the deck and blocking the side discharge outlet from the cutting chambers to place the mower in it mulching mode of operation.

Also carried under cutting deck 4 is a shroud means extending downwardly from deck 4 and defining three substantially cylindrical cutting chambers 16, 18 and 20 surrounding cutting blades 14 with one blade 14 being received in each chamber. As shown in FIG. 2, cutting chambers 16, 18 and 20 extend laterally across deck 4, in a side-by-side manner. Preferably, middle cutting chamber 18 is set slightly forwardly from side cutting chambers 16 and 20 to allow the orbits of blades 14 to overlap but not intersect. This ensures that no uncut strips will be left between blades 14 and does not require that the rotation of blades 14 be timed relative to one another. However, other cutting chamber configurations would be possible, e.g. cutting chambers 16, 18 and 20 could be aligned in a straight transverse line across deck 4 rather than being staggered relative to one another. In any event, the shroud means has a predetermined transverse width, indicated as w in FIG. 2, extending substantially across the width of deck 4.

The shroud means comprises a front half 21 made from two removable shroud portions 26 and 28 and a rear half 22 made mostly from a nonremovable shroud portion 30. In effect, front half 21 of the shroud means defined by shroud portions 26 and 28 has a scalloped configuration forming the forward arcuate faces of cutting chambers 16, 18 and 20 while rear half 22 of the shroud means formed by shroud portion 30 has a similar scalloped configuration facing toward front half 21 and forming the rearward arcuate faces of cutting chambers 16, 18 and 20. See FIG. 2. In the overlapping regions of the cutting chambers 16, 18 and 20, an opening 24 is provided in the shroud means between adjacent chambers. Openings 24 are important in the discharge/collection mode of operation as they allow grass clippings within chambers 16, 18 and 20 to travel in a grass discharge path through the chambers and out through side discharge outlet 12.

Referring to FIG. 2., nonremovable or fixed shroud portion 30 extends downwardly from the underside of deck 4 and rearwardly from cutting blades 14 and defines rear half 22 of cutting chambers 16, 18 and 20. In the preferred embodiment, fixed shroud portion 30 is a steel weldment secured to deck 4 in any suitable manner, e.g. with threaded fasteners (not shown). Shroud portion 30 is referred to as being "nonremovable" in the sense that it is intended to and normally would remain in place within deck 4 during normal operation of mower 2 in both the discharge/collection mode and the mulching mode of operation. Shroud portion 30 could extend all the way across the width w of the shroud means to form the entire rear half of the shroud means. Alternatively, shroud portion 30 could terminate at the points marked 31 in FIG. 2 with the remaining 45° of the back half of side cutting chambers 16 and 20 simply being formed by the side wall of skirt 10 in that area.

Figure 3:
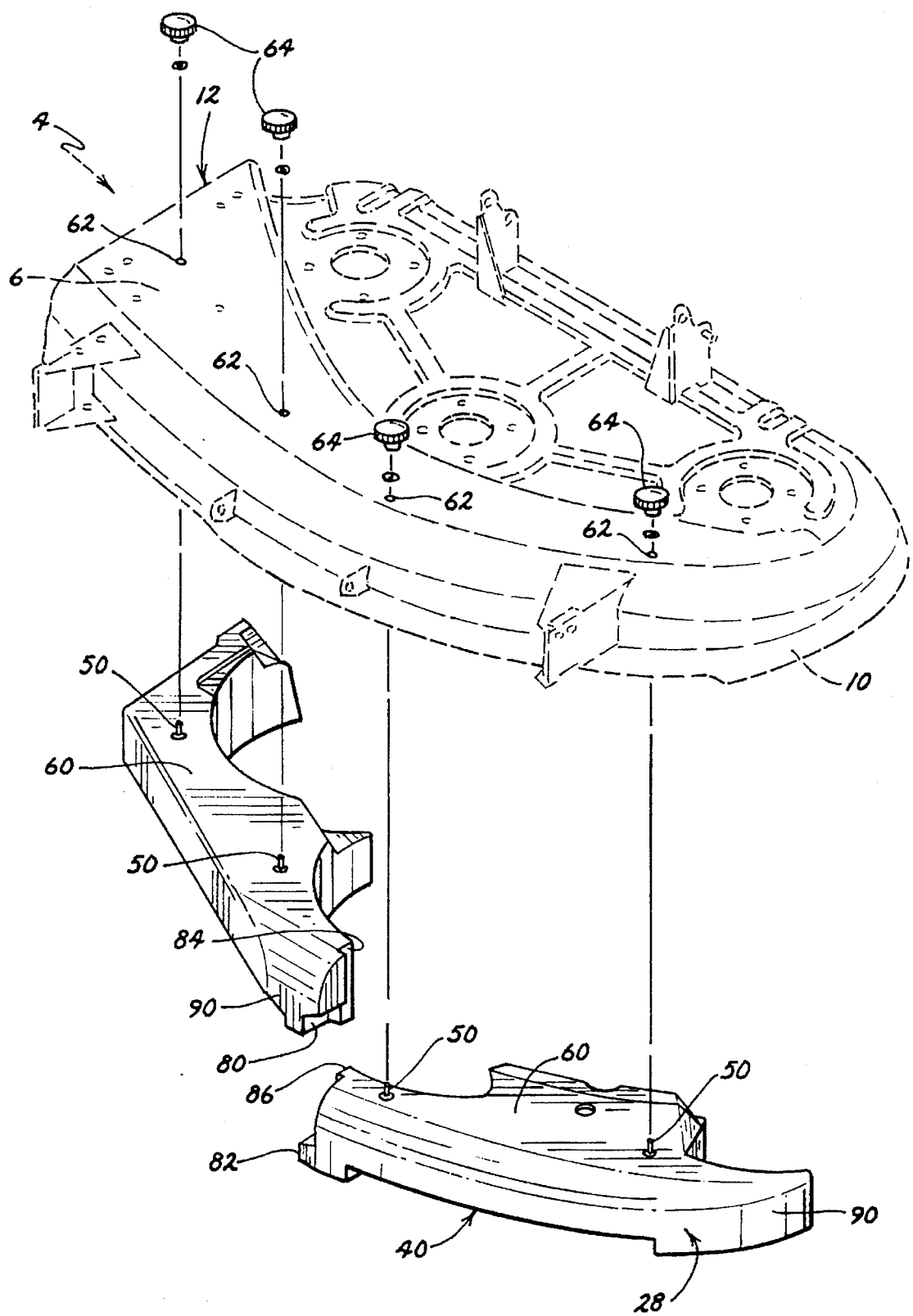
FIG. 3 is a perspective view of the cutting deck of the mower of FIG. 1, particularly showing the removable shroud portions in an exploded manner removed from the deck, with the shroud portions being disassembled from one another, and illustrating the use of the hand tightenable, rotatable knobs located above the upper surface of the deck for attaching the removable shroud portions to the deck.

Now referring to FIGS. 2 and 3, removable shroud portions 26 and 28 extend laterally across cutting deck 4, and forwardly of cutting blades 14. Removable shroud portions 26 and 28 define front half 21 of cutting chambers 16, 18 and 20. Clearance is provided to prevent contact between removable shroud portions 26 and 28 and the tips of cutting blades 14. Preferably, the removable shroud portions 26 and 28 are hollow, thin-walled rotationally molded plastic members. In the preferred embodiment, removable shroud portions are made from linear high density polyethylene.

Each cutting chamber 16, 18 and 20 preferably has one or more grass deflecting members or "kickers" located within the cutting chamber and located above radially outward portions of the orbit of each blade 14. These deflecting members have deflecting surfaces which are designed to deflect at least some of the grass clippings downwardly into the path of the associated cutting blade 14 for eventual disposal in the cut grass path, as taught by U.S. Pat. No. 5,133,176 to Baumann, which is hereby incorporated by reference. Some of these deflecting members (not shown) will be permanently bolted to the underside of the top wall 6 of deck 4 to be located in desired locations around various of the cutting chambers. Others of the deflecting members can be integrally molded to one or more of the removable shroud portions. For example, removable shroud portion 28 includes two such deflecting members 34 so located that one such deflecting member 34 will be positioned in middle cutting chamber 18 and the other such deflecting member 34 in side cutting chamber 20. Deflecting members 34 lie above the plane of rotation of blades 14.

Figure 5:
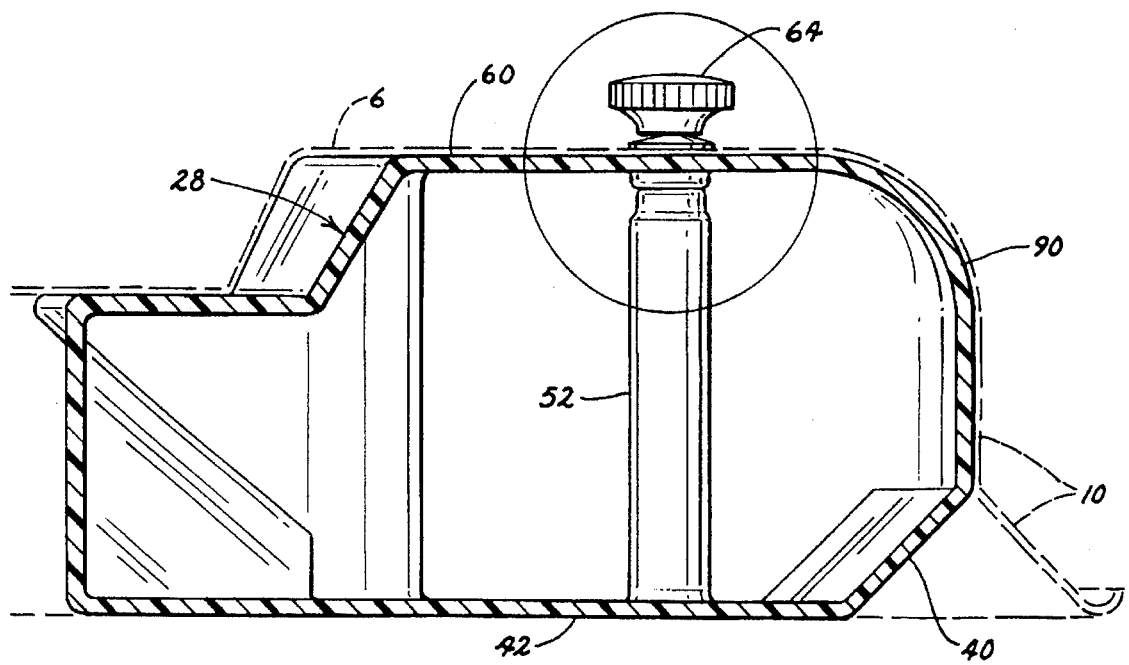
FIG. 5 is a cross-sectional view through one of the removable shroud portions of this invention taken along lines 5—5 of FIG. 2, particularly illustrating the attachment bolt and rotatable knob for attaching such shroud portion/to the deck.

Referring to FIGS. 2 and 5, bevels 40 extend over substantial portions of the length of the front edge of each removable shroud portion 26 and 28. Bevels 40 slant upwardly from a lower surface 42 of each removable shroud portion to terminate above lower surface 42 along the front edge thereof as shown best in FIG. 5. Bevels 40 provide anti-catch features for reducing the possibility of debris or fixed objects displacing removable shrouds 26 and 28 back into the orbits of the rotating cutting blades 14. If debris or a fixed object is encountered, bevels 40 will tend to force deck 4 upward and over the debris or fixed object rather that impart a rearward force on removable shroud portions 26 and 28 which would tend to force removable shroud portions 26 and 28 back into the rotating blades 14. Thus, bevels 40 help allow debris to pass beneath deck and help prevent damage to shroud portions 26 and 28.

Figure 6:
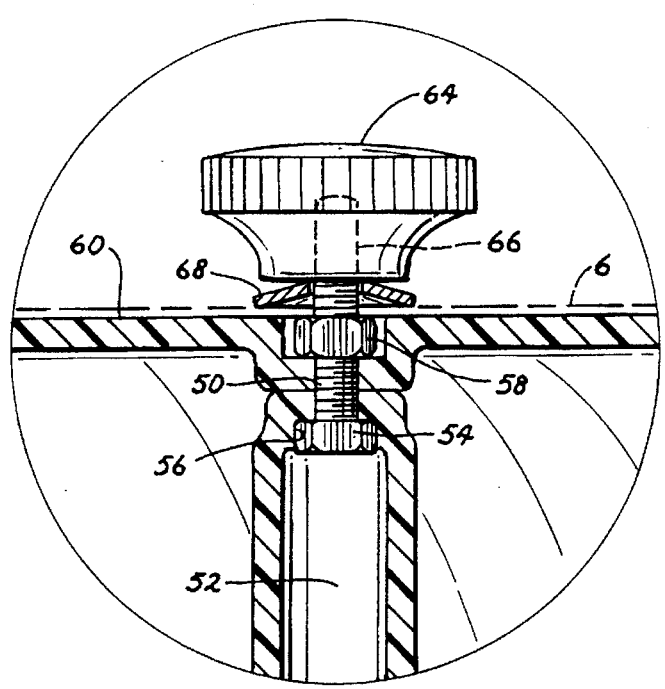
FIG. 6 is an enlarged cross-sectional view of the circled portion of FIG. 5, more particularly illustrating the attachment bolt and rotatable knob shown in FIG. 5.

With reference to FIGS. 3, 5 and 6, each removable shroud portion 26 and 28 is provided with threaded fasteners as a means for removably securing removable shroud portions 26 and 28 to deck 4. A hex bolt 50 is passed into a vertical pocket 52 formed in the removable shroud portions 26 and 28 extending upwardly from lower surface 42 of removable shroud portions 26 and 28. The head 54 of hex bolt 50 is nonrotatably received in a hex-shaped recess 56 positioned in the closed upper end of pocket 52 with a threaded segment of hex bolt 50 extending upwardly therefrom. Nut 58 is received on the threaded segment and is tightened in a cylindrical recess in an upper surface 60 of the removable shroud portion fixedly fastening hex bolt 50 to the removable shroud portions 26 and 28. When so installed, hex bolt 50 is nonrotatable relative to the shroud portion since the hex head 54 of bolt 50 is nonrotatably received within the similarly shaped recess 56 at the upper end of pocket 52.

Use of the vertical pocket 52 allows a relatively short, standard sized bolt 50 to be used as an attachment member for the shroud portion. In installing such bolt 50, the shroud portion can be inverted and the bolt dropped down through pocket 52 until head 54 thereof seats within recess 56. Nut 58 can then be tightened onto bolt 50 to secure it in place, and the shroud portion set upright. Without such an elongated vertical pocket 52, recess 56 would have to be molded on lower surface 42 of the shroud portion and a long bolt 50 used to extend between lower surface 52 to slightly above upper surface 60 of the shroud portion. However, since such long bolts would be non-standard parts and relatively expensive to purchase, and since pocket 52 can be easily molded into the removable shroud portion with no or little additional cost, the use of pocket 52 leading to the use of a standard sized bolt 50 is preferred.

When a plurality of bolts 50 are installed on each removable shroud portion, they form a plurality of upwardly extending threaded attachment members which can pass through openings or holes 62 provided therefor in the top wall 6 of deck 4. See FIG. 1. The length of bolts 50 are chosen such that bolts 50 extend slightly above top wall 6 when the removable shroud portions are installed within deck 4. Rotatable tightening knobs 64 are then provided which are sized to allow such knobs 64 to be easily gripped and turned by hand. These knobs 64 include an interior threaded bore or nut portion 66 that can be threaded onto and tightened on the threaded upper shanks of bolts 50. When knobs 64 are tightened firmly against the top wall 6 of deck 4 and against spring washers 68, removable shroud portions 26 and 28 will be firmly affixed to deck 4. However, knobs 64 can be easily reached and turned by the user from above deck 4 when the shroud portions are to be removed without having to crawl or reach beneath deck 4.

Referring now to FIG. 3, the removable shroud portions 26 and 28 are installed in an abutting end-to-end fashion with the conjoined shroud portions extending across the width w of the shroud means. Each abutting end of each shroud portion 26 and 28 is provided with a mating non-planar geometry which interlock the shroud portions 26 and 28 together when assembled. The mating geometry at the ends of removable shroud portions 26 and 28 facilitate the proper orientation of the shroud portions 26 and 28 relative to each other and otherwise aid in positioning shroud portions 26 and 28 within deck 4.

Different types of mating geometry could be used between the abutted ends of shroud portions 26 and 28. However, as shown in FIG. 3, one preferred geometry comprises a mortise and tenon type joint in both horizontal and vertical planes. For example, the end of removable shroud portion 26 includes a horizontally disposed mortise groove 80 at the bottom thereof for receiving a horizontally disposed tenon 82 on the end of removable shroud portion 28. For additional guidance and stability, the end of removable shroud portion 26 includes a vertically disposed mortise groove 84 at the rear side thereof for additionally receiving a vertically disposed tenon 86 on the end of removable shroud portion 28. When shroud portions 26 and 28 are installed within deck 4, a small gap is present between the top of tenon 82 and the upper horizontal surface of groove 80. This mating geometry is designed to allow the removable shroud portion 26 to drop a short distance vertically relative to shroud portion 28 after being released from deck 4 until these surfaces engage, and to then allow shroud portion 26 to be slid laterally to completely disengage the end of shroud portion 28, as will be described in more detail hereafter.

The removable shroud portions 26 and 28 are also provided with surfaces designed to interact with the skirt and top wall 6 of deck 4 to facilitate the proper installation of the shroud portions 26 and 28 within deck 4. The removable shroud portions 26 and 28 are provided with a relatively flat top surface 60 designed to abut against the underside of deck 4 when installed. In addition, the removable shroud portions 26 and 28 are also provided with front curved surfaces 90 which are shaped to be abutted against the backside of the skirt when the shroud portions are installed. Curved surface 90 on shroud portion 28 extends for most of the length of shroud portion 28 while only a short curved surface 90 is present on shroud portion 26. Conforming to the specific geometry of the cutting deck 4 and skirt 10, the surfaces 60 and 90 facilitate the installation of the removable shroud portions 26 and 28 as they tend to positively guide or align the removable shroud portions 26 and 28 into proper position within the cutting deck 4. Another benefit of these surfaces 60 and 90 is to increase the structural integrity of removable shroud portions 26 and 28 and help to maintain the proper clearance in the cutting chambers 16, 18 and 20 between the cutting blades 14 and the arcuate sections of the removable shroud portions 26 and 28.

Figure 4:
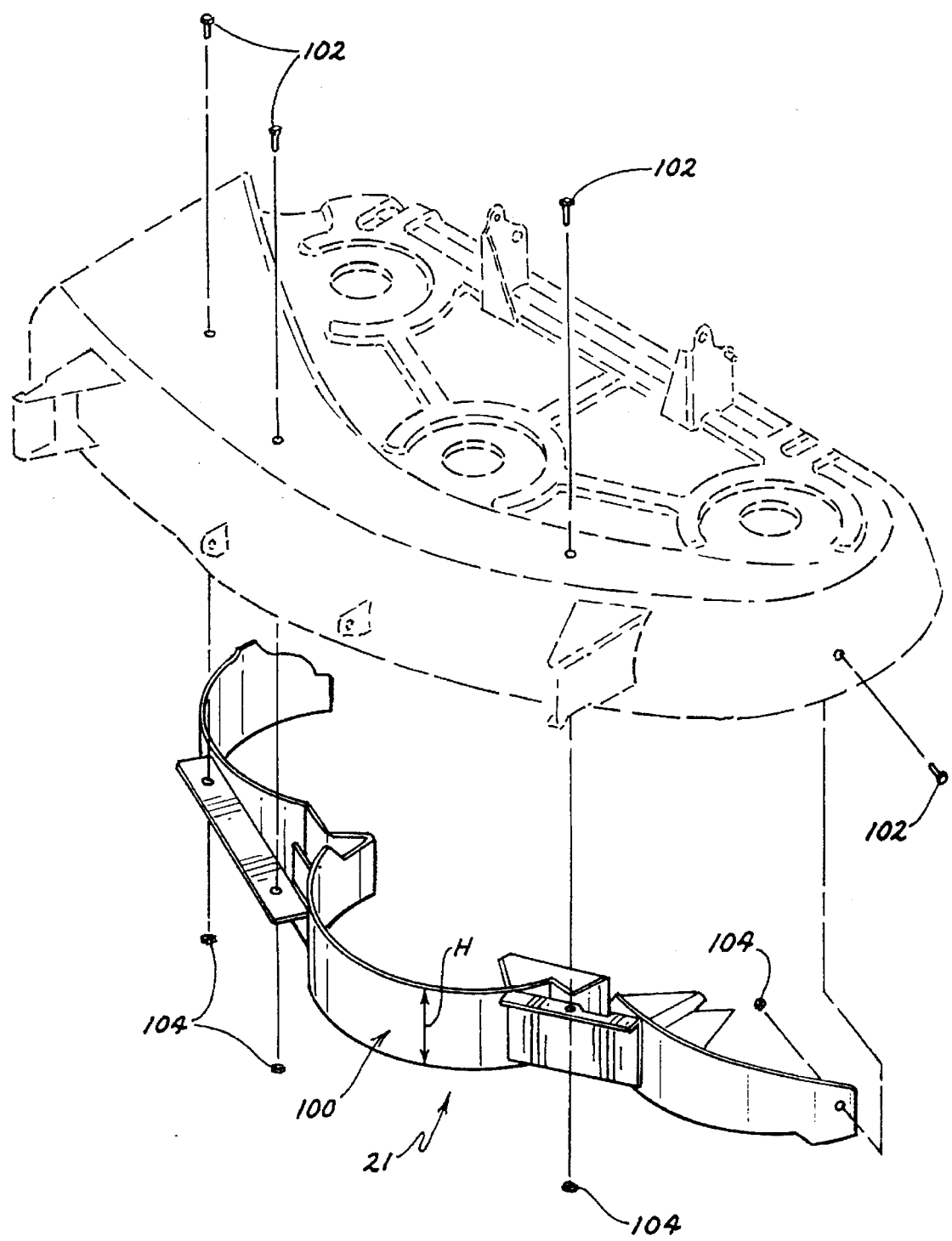
FIG. 4 is a perspective view similar to FIG. 3 of a prior art cutting deck of a prior art mower, particularly illustrating the longer one piece removable shroud portion of the prior art mower and the nature of the threaded attachment members used to attach that shroud portion to the mower deck.

An important feature of this invention is the fact that front half 21 of the shroud means is formed by two removable shroud portions 26 and 28 instead of a single integrated shroud portion as in the prior art mower of FIG. 4. Preferably, each shroud portion 26 and 28 is approximately one half of the transverse width w of the entire shroud means. Thus, the first removable shroud portion 26 forms the forward arcuate wall of the cutting chamber 16 nearest side discharge outlet 12 and a portion of the forward arcuate wall of middle cutting chamber 18. The other or second removable shroud portion 28 forms the remaining section of the forward arcuate wall of middle cutting chamber 18 as well as the forward arcuate wall of the other side cutting chamber 20 which is furthest from side discharge outlet 12. This arrangement or proportioning of the length of the individual removable shroud portions 26 and 28 allows the removable shroud portions to be easily installed and removed through side discharge outlet 12 without having to lift the entire mower 2.

The advantages of the present invention can best be understood by reviewing the procedures needed to convert the known Toro prior art mower from its mulching mode of operation to its discharge/collection mode. With reference to FIG. 4, front half 21 of the shroud means was formed by a single, integrated shroud portion 100 in the nature of a steel weldment that was secured to deck 4 with downwardly extending threaded fasteners 102 that were tightened or loosened only from beneath deck 4. Because the height of shroud portion 100, indicated as h in FIG. 4, was greater than the distance between the ground and the lower edge of skirt 10 even when deck 4 was at its maximum height, shroud portion 100 could be removed only by jacking up the entire mower, including the traction unit 5, to gain additional clearance. With this additional clearance, the user could crawl or reach beneath deck 4 to release the nuts 104, the shroud portion 100 could then be dropped down to the ground, and then the shroud portion 100 could be slid beneath the lower edge of skirt 10 to remove it. It was difficult, if not impossible, to try and slide shroud portion 100 out through side discharge outlet 12 due to the length and scalloped configuration of the shroud portion and the inevitable interference with the cutting blades 14.

This difficult and time consuming operation can be easily contrasted with that of the present invention. In the present invention, the user does not have to jack up or raise the entire mower, but simply preferably puts deck 4 into its maximum height position. Each shroud portion 26 and 28 can then be individually removed through side discharge outlet 12 by loosening knobs 64 which can be reached and manipulated from above deck 4 without having to crawl or reach beneath deck 4. First, the two knobs 64 securing the first shroud portion 26 are removed and that shroud portion 26 will vertically drop a slight distance until the mortise groove 80 and tenon 82 engage against one another. Then, the user can easily manipulate shroud portion 26 out of deck 4 by simply sliding it to the side through and out of side discharge outlet 12o This can be easily done since shroud portion 26 has a length which is substantially less than the length of the transverse width w of the shroud means.

With the first removable shroud portion 26 removed in the fashion just described, mower 2 has already been converted to its discharge/collection mode. In other words, side discharge outlet 12 is now in communication with the interior of the shroud means since at least the forward arcuate wall portion of cutting chamber 16 proximate to side discharge outlet 12 is removed. While some mulching will still take place due to the presence of the grass deflecting members that are permanently mounted in the chambers, and due to the presence of the grass deflecting members 34 on the other shroud portion 28, much of the clippings will flow to the side of deck 4 having side discharge outlet 12, progressively travelling from side cutting chamber 20, through middle cutting chamber 18, and finally through side cutting chamber 16 and out through side discharge outlet 12. In many cases, removing only the first removable shroud portion 26 will be sufficient for most people to convert mower 2 into a discharge/collection mode of operation providing acceptable performance.

However, the remaining portion of front half 21 of the shroud means is also designed to be removable, in the nature of second removable shroud portion 28, in those cases where a higher level of performance in the discharge/collection mode is desired. Remember, with second shroud portion 28 in place but with first shroud portion 26 removed, mower 2 will operate in the discharge/collection mode, but some mulching will be done in the middle and furthest side cutting chambers 18 and 20 and the presence of second shroud portion 28 interferes with a clean grass flow towards side discharge outlet 12. This manifests itself in some grass conditions by some grass stragglers that are deposited on top of the ground beneath the middle and furthest side cutting chambers 18 and 20. Thus, if a higher level of performance is desired in the discharge/collection mode in which many of these stragglers are eliminated by virtue of also being discharged or collected with the rest of the clippings, it will be necessary to further remove second shroud portion 28.

To remove second shroud portion 28, this will be done after the first shroud portion 26 has been dropped and slid out through side discharge outlet 12. With the first shroud portion 26 gone or removed in this manner, the user can then remove the two knobs 64 holding second shroud portion 28 in place. This shroud portion 28 will drop down onto the ground. With the shroud portion 28 in this position, the user can simply grip or push it along the front skirt of deck 4 until it also slides out through side discharge outlet 12. It is somewhat more difficult to remove second shroud portion 28 than first shroud portion 26, because the middle or outermost cutting blades 14 might have to be turned slightly during the removal process to avoid interfering with shroud portion 28, but it is still relatively easy to remove it because it is only about half the total width w of the shroud means. In addition, each shroud portion 26 and 28 is also about half the total weight than a similarly shaped and constructed shroud portion that would extend the full width w of the shroud means, making such shroud portions 26 and 28 lighter and easier to manipulate. Thus, both shroud portions 26 and 28 can be released from positions above deck 4, and then slid out through side discharge outlet 12, to easily convert the mower between its mulching mode and its discharge/collection mode of operation. This can be done without having to specially raise or jack mower 2 up. The phrase "discharge/collection" mode of operation is simply meant to refer to that mode which is initiated by removal of at least the first shroud portion 26. In this mode, at least some of the grass clippings, but perhaps not all, flow to the side and out through side discharge outlet 12, either to be deposited to the side of the mower on top of the grass or to be collected in a collection device associated with side discharge outlet 12.

Thus, the phrase "discharge/collection" mode is used to denote that a bag or other collection device might optionally be associated with side discharge outlet 12, and that the primary disposal of the grass clippings from deck 4 is through side discharge outlet 12 rather than downwardly from cutting chambers 16, 8 and 20. Obviously, some mulching takes place even in the discharge/collection mode of operation, but the mulching of the grass clippings downwardly through the open bottom faces of the cutting chamber is not the primary means of exit from the cutting chambers. In the "mulching mode of operation, the deposition of the clippings downwardly through the open bottom faces of cutting chambers 16, 18 and 20 is the primary means of exit as such cutting chambers are closed off from side discharge outlet 12 by the presence of both removable shroud portions 26 and 28.

In the preferred embodiment, the lengths of removable shroud portions 26 and 28 are approximately equal with each removable shroud portion 26 and 28 extending over approximately one-half the width w of the shroud means. It should be appreciated that the lengths of the removable shroud portions 26 and 28 were chosen to allow both shroud portions 26 and 28 to be passed through side discharge outlet 12 without the need for lifting the entire mower. It would be possible to make front half 21 of the shroud means from more than two removable shroud portions, e.g. three or four such portions, each such shroud portion then comprising less than one half the total width w of the shroud means, e.g. ⅓ or ¼ the width w. The advantage of doing this would be that each such shorter shroud portion would be even easier to slide out through side discharge outlet 12, but it would take somewhat longer to loosen and remove all of these shroud portions. Thus, the use of two, approximately equal sized shroud portions to make up front half 21 of the shroud means has been found to be satisfactory for the purposes of this invention.

As is clear from the above, the improved mower according to this invention is designed to operate in two modes of operation- In its first mulching mode of operation the mower operates as a mulching mower. Discharge of grass clippings through side discharge outlet 12 is prevented by the removable shroud portions 26 and 28 in the first mode of operation. Configured as a mulching mower in the first mode of operation, the grass is confined to circulate within the cutting chambers 16, 18 and 20 until ultimately forced downward into the cut grass path.

In its second discharge/collection mode of operation, the mower operates substantially as a side discharge or bagging mower. The second mode of operation is realized by removing at least the first removable shroud portion 26 proximate side discharge outlet 12. The second removable shroud portion 28 can optionally be removed to increase the discharge/collection performance of mower 2. In any event, in this discharge/collection mode of operation, grass clippings entrained by the action of cutting blades 14 within cutting chambers 18 and 20 are transported through windows 24 toward side discharge outlet 12. Clippings from cutting chambers 18 and 20 together with clippings from cutting chamber 16 are transported toward and pass out through side discharge outlet 12.

If it is necessary to reinstall either of the shroud portions 26 and 28, this can again be done without having to jack up mower 2. Shroud portions 26 and 28 can be installed by sliding them through side discharge outlet 12 and along the front face of skirt 10. In this respect, the engagement of the front face 90 of shroud portions 26 and 28 with skirt 10 helps guide the shroud portions into place. With second shroud portion 28 in place, the first portion 26 can be installed by sliding it in until it abuts against the end of second shroud portion 28. It can then be lifted up and pushed in until the interlocking mortise and tenon joints 80/82 and 84/86 interfit, ensuring proper alignment and fit. With shroud portions 26 and 28 in place, the shanks of bolts 50 will extend up through deck 4, and the hand tightenable knobs 64 can be easily tightened thereon to attach the shroud portions to deck 4.

Various modifications of this invention will be apparent to those skilled in the art. For example, the removal of second shroud portion 28 is optional. It would be possible for such shroud portion 28 to be non-removably affixed to deck 4 such that only the first shroud portion 26 is removable from deck 4 through side discharge outlet 12. Such a mower 2 would still fall within the present invention since its conversion to its discharge/collection mode of operation is done by removing a less than full width shroud portion 26 for at least the cutting chamber nearest side discharge outlet 12 through side discharge outlet 12. Thus, the scope of the invention is to be limited only by the appended claims.

We claim:

1. A multi-bladed mower which is convertible between a discharge/collection mode of operation and a mulching mode of operation, which comprises:
    (a) a cutting deck which is movable over the ground, wherein the cutting deck includes a peripheral skirt with such skirt having a laterally opening side discharge outlet for grass clippings;
    (b) shroud means having a predetermined transverse width relative to the deck with the shroud means extending downwardly from the deck and substantially defining a plurality of generally cylindrical cutting chambers extending laterally across the deck with one cutting chamber being located nearest the side discharge outlet, wherein adjacent cutting chambers have interior openings connecting one another to allow at least some grass clippings to travel between cutting chambers;
    (c) a rotatably driven, substantially horizontal cutting blade mounted in each of the cutting chambers; and
    (d) means for removably attaching a portion of the shroud means to the deck to convert the deck between the mulching mode of operation in which the shroud portion is installed in the deck and the cutting chambers are closed to the side discharge outlet and the discharge/collection mode of operation in which the shroud portion is removed from the deck and the cutting chambers are open to the side discharge outlet, wherein the removable shroud portion forms part of at least the one cutting chamber nearest the side discharge outlet and extends laterally relative to the deck over substantially less than the entire transverse width of the shroud means, wherein the removable shroud portion is sufficiently unobstructed relative to the deck to permit sliding of the shroud portion beneath the deck such that the removable shroud portion can be easily installed or removed from the deck by sliding it in or out of the side discharge outlet.

2. A mower as recited in claim 1, wherein the blades are rotated in the same direction such that a forward portion of each blade's orbit moves toward the side discharge outlet, and wherein the removable shroud portion forms a forward face of at least the one cutting chamber nearest the side discharge outlet.

3. A mower as recited in claim 2, wherein the removable shroud portion forms a forward face of at least the one cutting chamber nearest the side discharge outlet and at least some of a forward face of the cutting chamber which is adjacent to the one cutting chamber nearest the side discharge outlet.

4. A mower as recited in claim 1, wherein the removable shroud portion extends over approximately one half of the entire transverse width of the shroud means.

5. A mower as recited in claim 1, wherein the removable shroud portion includes means for defining a front surface that is shaped to abut against an interior surface of the skirt to help guide the removable shroud portion into place.

6. A mower as recited in claim 1, wherein the removable shroud portion includes means for defining a top surface that is shaped to abut against an underside of the deck when the removable shroud portion is attached to the deck.

7. A mower as recited in claim 1, wherein the means for attaching the removable shroud portion is located above the deck to allow the removable shroud portion to be secured to or released from the deck by the user from above the deck.

8. A mower as recited in claim 7, wherein the means for attaching comprises:
 (a) at least one threaded attachment member nonrotatably secured to the removable shroud portion and extending upwardly therefrom to pass through an opening in the deck; and
 (b) a threaded rotatable locking member received on an upper portion of each threaded attachment member above the deck and capable of being tightened against an upper surface of the deck to attach the removable shroud portion to the deck.

9. A mower as recited in claim 8, wherein the rotatable locking member includes a rotatable knob which is sized sufficiently large to allow the knob to be gripped by hand by the user to turn the locking member on the threaded attachment member.

10. A mower as recited in claim 8, wherein the threaded attachment member comprises a bolt separate from the removable shroud portion and having a non-circular head, and wherein the removable shroud portion has a downwardly facing recess which is shaped to nonrotatably receive the bolt head with the bolt extending upwardly from the recess in which the bolt head is received through the removable shroud portion and through the opening in the deck.

11. A mower as recited in claim 10, wherein the removable shroud portion includes a vertical pocket extending upwardly from a lower surface of the removable shroud portion toward an upper surface of the removable shroud portion, the pocket having an upper end which carries the recess and an open lower end on the lower surface of the removable shroud portion to allow the bolt to pass into the pocket through the open lower end thereof and the bolt head to be received in the recess.

12. A mower as recited in claim 1, wherein the removable shroud portion has an innermost end located interiorly in the deck away from the side discharge outlet when the removable shroud portion is installed in the deck, and wherein the innermost end of the removable shroud portion is shaped to interlock with a facing end of a remaining portion of the shroud means when the innermost end and facing end abut against one another.

13. A mower as recited in claim 1, wherein the removable shroud portion comprises an innermost end located interiorly in the deck away from the side discharge outlet when the removable shroud portion is installed in the deck, and wherein the innermost end of the removable shroud portion is shaped to releasably engage a complementary mating end of a remaining portion of the shroud means to facilitate proper positioning of the removable shroud portion.

14. A mower as recited in claim 1, wherein a plurality of removable shroud portions extend laterally across the deck over substantially the entire transverse width of the deck in an end-to-end fashion to form approximately one half of the shroud means, each removable shroud portion extending substantially less than the entire transverse width of the deck so that each portion can be removed through the side discharge outlet.

15. A mower as recited in claim 14, wherein each removable shroud portion has ends which are shaped to interlock with abutting ends on adjacent removable shroud portions when the removable shroud portions are assembled together end-to-end.

16. A mower as recited in claim 14, wherein two removable shroud portions are used, each of which extend over approximately one half of the transverse width of the deck.

17. A mower as recited in claim 1, wherein the skirt is interrupted to form the side discharge outlet.

18. A multi-bladed mower which is convertible between a discharge/collection mode of operation and a mulching mode of operation, which comprises:
 (a) a cutting deck which is movable over the ground, wherein the cutting deck includes a discharge outlet for grass clippings;
 (b) means for forming a plurality of generally cylindrical cutting chambers extending laterally across the deck, wherein the cutting chamber forming means includes a shroud portion extending downwardly from the deck and located proximate to and blocking the discharge outlet when the deck is in its mulching mode of operation;
 (c) a rotatably driven, substantially horizontal cutting blade mounted in each of the cutting chambers; and
 (d) means for removably attaching the shroud portion to the deck to convert the deck between the mulching mode of operation in which the shroud portion is installed in the deck and the discharge outlet is blocked and the discharge/collection mode of operation in which the shroud portion is removed from the deck and the discharge outlet is open, wherein the removable shroud portion is sized such that the removable shroud portion can be installed or removed from the deck by sliding it in or out of the discharge outlet, and wherein a non-planar, interlocking geometry is provided on abutting ends of the removable shroud portion and an adjacent portion of the cutting chamber forming means to help position the removable shroud portion during installation.

19. A mower as recited in claim 18, wherein the removable shroud portion is large enough to form a portion of multiple cutting chambers.

20. A mower as recited in claim 18, wherein the discharge outlet is a side discharge outlet on the deck.

21. A mower as recited in claim 20, wherein the deck includes a peripheral skirt, and wherein the skirt is interrupted to form the side discharge outlet.

22. A mower as recited in claim 21, wherein the removable shroud portion is large enough to form a portion of multiple cutting chambers.

23. A mower as recited in claim 22, wherein three cutting chambers extend laterally across the deck, and wherein the removable shroud portion is large enough to form a portion of two of the cutting chambers.

24. A mower as recited in claim 18, wherein the non-planar geometry is provided by at least one mortise and tenon joint on the abutting ends.

25. A mower as recited in claim 24, wherein the mortise and tenon joint extends horizontally on the abutting ends.

26. A mower as recited in claim 24, wherein the mortise and tenon joint extends vertically on the abutting ends.

27. A mower as recited in claim 18, wherein the non-planar geometry is provided by at least two mortise and tenon oints on the abutting ends, wherein one joint extends vertically on the abutting ends and the other joint extends horizontally on the abutting ends.

28. A mower as recited in claim 27, wherein the horizontally extending joint has a small gap between a top surface of the tenon and an upper horizontal surface of the mortise when the removable shroud portion is installed in the deck, whereby the removable shroud portion is able to drop a short distance vertically after being released from the deck until these surfaces engage before the shroud portion is slid out through the discharge outlet.

29. A multi-bladed mower which is convertible between a discharge/collection mode of operation and a mulching mode of operation, which comprises:

(a) a cutting deck which is movable over the ground, wherein the cutting deck includes a discharge outlet for grass clippings;

(b) means for forming a plurality of generally cylindrical cutting chambers extending laterally across the deck, wherein the cutting chamber forming means includes a shroud portion extending downwardly from the deck and located proximate to and blocking the discharge outlet when the deck is in its mulching mode of operation;

(c) a rotatably driven, substantially horizontal cutting blade mounted in each of the cutting chambers; and (d) means for removably attaching the shroud portion to the deck to convert the deck between the mulching mode of operation in which the shroud portion is installed in the deck and the discharge outlet is blocked and the discharge/collection mode of operation in which the shroud portion is removed from the deck and the discharge outlet is open, wherein the attaching means comprises:

(i) at least one threaded attachment member non-rotatably secured to the removable shroud portion; and (ii) a threaded rotatable locking member cooperable with the attachment member which locking member is located above the deck and is capable of being tightened against an upper surface of the deck to attach the removable shroud portion to the deck such that the removable shroud portion can be released from above the deck by selective manipulation of the locking member without having to manipulate fasteners located beneath the deck.

30. A mower as recited in claim 29, wherein the rotatable locking member includes a rotatable knob which is sized sufficiently large to allow the knob to be gripped by hand by a user to turn the locking member relative to the threaded attachment member.

31. A mower as recited in claim 29, wherein the threaded attachment member comprises a bolt non-rotatably secured to the removable shroud portion and extending upwardly therefrom to pass through an opening in the deck, and wherein the threaded rotatable locking member is a knob or nut received on an upper portion of the bolt above the deck.

32. A mower as recited in claim 29, wherein the removable shroud portion is large enough to form a portion of multiple cutting chambers, and wherein multiple threaded attachment members and locking members are spaced along the removable shroud portion to hold the same in place.

* * * * *